United States Patent
Vasudevan et al.

(10) Patent No.: US 12,526,299 B2
(45) Date of Patent: Jan. 13, 2026

(54) USER LOGIN ANOMALY DETECTION METHOD AND SYSTEM

(71) Applicant: BULL SAS, Les Clayes-sous-Bois (FR)

(72) Inventors: Vinod Vasudevan, Fairfax, VA (US); Ravi Raman, Bangalore (IN)

(73) Assignee: BULL SAS, Les Clayes-sous-Bois (FR)

( * ) Notice: Subject to any disclaimer, the term of this patent is extended or adjusted under 35 U.S.C. 154(b) by 91 days.

(21) Appl. No.: 18/358,589

(22) Filed: Jul. 25, 2023

(65) Prior Publication Data

US 2024/0073231 A1    Feb. 29, 2024

(30) Foreign Application Priority Data

Aug. 29, 2022  (EP) .................................. 22306273

(51) Int. Cl.
*H04L 9/40*    (2022.01)
*G06F 21/31*   (2013.01)
*G06F 21/55*   (2013.01)

(52) U.S. Cl.
CPC .......... *H04L 63/1425* (2013.01); *G06F 21/31* (2013.01); *G06F 21/552* (2013.01); *H04L 63/08* (2013.01); *H04L 63/101* (2013.01); *H04L 63/1416* (2013.01)

(58) Field of Classification Search
CPC ....... G06F 21/31; G06F 21/552; H04L 63/08; H04L 63/101; H04L 63/1416; H04L 63/1425
See application file for complete search history.

(56) References Cited

U.S. PATENT DOCUMENTS

| | | | |
|---|---|---|---|
| 8,312,540 B1 | 11/2012 | Kahn et al. | |
| 11,218,473 B2* | 1/2022 | Cheek | H04L 63/1466 |
| 11,269,978 B2* | 3/2022 | Cohen | H04L 63/1425 |
| 11,438,354 B2* | 9/2022 | McClymont, Jr. | |
| | | | H04L 63/1425 |
| 11,954,189 B2* | 4/2024 | Erramilli | G06F 21/316 |
| 12,184,673 B2* | 12/2024 | Raman | H04L 63/1416 |
| 12,341,801 B2* | 6/2025 | Tormasov | H04L 63/1425 |
| 2019/0190962 A1* | 6/2019 | Latham | H04L 63/1425 |
| 2020/0128047 A1 | 4/2020 | Biswas et al. | |

(Continued)

OTHER PUBLICATIONS

European Search Report and Written Opinion issued in EP22306273.8 Feb. 3, 2023 (6 pages).

*Primary Examiner* — Thomas J Dailey
(74) *Attorney, Agent, or Firm* — ARC IP Law, PC; Joseph J. Mayo

(57) ABSTRACT

The invention relates to a method detecting one or more anomalies regarding logins of a user on an authentication system. The method includes at least one iteration of a monitoring phase that includes collecting a log of successful logins of the user on the authentication system, and calculating, for each monitored parameter, a probability density, in the log, of each predetermined value of the parameter. The method also includes calculating, for each parameter, a weight, as a function of the probability density of each predetermined value of the parameter, calculating an anomaly score for the log as a function of the weights and the probability densities; and comparing the anomaly score to a given threshold in order to determine an anomaly in the daily log for the user. The invention also relates to a computer program product and a device configured to carry out the method.

9 Claims, 1 Drawing Sheet

(56) References Cited

U.S. PATENT DOCUMENTS

| | | | |
|---|---|---|---|
| 2020/0137067 A1* | 4/2020 | Nambiar | G06F 21/554 |
| 2021/0349979 A1* | 11/2021 | Cohen | H04L 63/1425 |
| 2022/0159025 A1* | 5/2022 | Niv | G06F 9/546 |
| 2022/0217156 A1* | 7/2022 | Wahbo | G06N 3/045 |

* cited by examiner

USER LOGIN ANOMALY DETECTION METHOD AND SYSTEM

This application claims priority to European Patent Application Number 22306273.8, filed 29 Aug. 2022, the specification of which is hereby incorporated herein by reference.

BACKGROUND OF THE INVENTION

Field of the Invention

At least one embodiment of the invention relates to a user login anomaly detection method. At least one embodiment of the invention also relates to a computer program and a device configured to carry out such a method.

The field of the invention is the field of detecting anomalies related to successful logins of a user on authentication system, and more particularly on an authentication system regulating access to SaaS services.

Description of the Related Art

Users log into cloud based SaaS Services, for example Microsoft® SaaS Services, hosted in the cloud, for example Azure cloud, using an authentication server that is hosted in the network providing said services, such as Microsoft Azure Active Directory (AD) authentication. The SaaS services can be email, file repositories, company intranet and a number of other business applications. Such authentication may get compromised due to weak passwords or through many more sophisticated attacks including phishing attacks that hackers launch on unsuspecting users to capture usernames & passwords. One such example is to launch brute force attacks in which cybercriminals use automated tools to obtain the account password. If successful, the attackers can then invade a network, elevate their rights with administrative access, disable security products, and even run ransomware to encrypt critical data and hold the companies/users hostage.

Hence there is a need to monitor the logins of users that take place through an authentication server of a network, either local or distant. As more and more companies and their users embrace this mode of authentication, this becomes all the more critical.

A purpose of at least one embodiment of the invention is to provide a solution for user login anomaly detection.

Another purpose of at least one embodiment of the invention is to provide a user login anomaly detection solution that is more user centric and more individualized for each user.

Yet another purpose of at least one embodiment of the invention is to provide a user login anomaly detection solution that is more efficient.

BRIEF SUMMARY OF THE INVENTION

One or more embodiments of the invention makes it possible to achieve at least one of these aims by a computer implemented method for detecting one or more anomalies regarding the logins of a user on a local, or remote, authentication system, such as a remote Active Directory, AD, authentication system. By way of at least one embodiment, the method includes at least one iteration of a monitoring phase for a user, the monitoring phase including the following steps:

collecting a log of successful logins of the user on the authentication system over a monitoring period;

the log including, for each successful login, measured values of several monitored parameters;

each measured value of each monitored parameter corresponding to a predetermined value among several values, called bins, previously defined for the parameter;

calculating, for each monitored parameter, a probability density, in the log, of each predetermined value of the parameter;

calculating, for each parameter, a weight, as a function of said probability density of each predetermined value of the parameter;

calculating an anomaly score for the log as a function of the weights and probability densities; and comparing the score to a given threshold in order to determine an anomaly in the daily log for the user.

At least one embodiment of the invention thus proposes user login anomaly detection based on only successful logins of the user, over a monitoring period. Several parameters are measured for each login and an anomaly score for the monitoring period is calculated based said parameters. Advantageously, in one or more embodiments, the invention proposes allocating different weights for each parameter in the computation of the anomaly score. Moreover, in at least one embodiment, the weight allocated to each parameter is itself calculated based on the probability density of each value said that the parameter takes during the monitoring period, i.e. in the log collected for the monitoring period. Thus, at least one embodiment of the invention proposes a solution for login anomaly detection that is more user centric and individualized for each user. As a consequence, the login anomaly detection according to one or more embodiments of the invention is more adapted for each user and provides more efficient login anomaly detection.

For at least one parameter, in one or more embodiments, at least one predetermined value said that the parameter may take, may be determined during an observation period, prior to the first iteration of the monitoring phase.

At least one embodiment of the invention may comprise, for at least one user, an observation period during which at least one value, i.e. bin, may be determined for at least one parameter. The determination of a least one value may be done by collecting logs of successful logins of the user during the observation period, and detecting in the logs each different value of the parameter. Each different value may thus be stored as a predetermined value, i.e. a bin, to be used during the monitoring phases(s) for the parameter and the user.

This enables a more personalized, and user centric, login anomaly detection, by way of one or more embodiments. Indeed, in at least one embodiment, the monitored parameters may take different values for different users. At least one embodiment of the invention allows use of values that are specific for each user, instead of using generic values common to all users.

Of course, by way of at least one embodiment, the observation period may be chosen as desired. According to one or more embodiments, the observation period may be a month.

The monitoring period may be chosen as desired, by way of at least one embodiment.

According to one or more embodiments, the monitoring period may be a day. Thus the log for each user will be collected for a, and in particular, each day. An anomaly score may then be determined for each day and an anomaly occurring during a specific day may be detected, by way of at least one embodiment.

Any parameter relative to a login configuration may be used as a monitored parameter in the present invention.

In one or more embodiments, for each login, a monitored parameter may comprise, or may be, the time of day, TOD, of the login. Thus, in at least one embodiment, it is possible to monitor the activity of the user during the day. This gives valuable information regarding the behavior of the user and helps detecting an anomaly. For example, for a user who never logs in during night time, several night time logins may indicate suspicious activity that has to be detected.

Alternatively, or in addition, by way of at least one embodiment, for each login, a monitored parameter may comprise, or may be, the day of week, DOW, of the login. Thus, in one or more embodiments, it is possible to monitor the activity of the user during the days of the week. This gives valuable information regarding the behavior of the user and helps detecting an anomaly over a week. For example, for a user who never logs in during the weekend, several logins during the weekend may indicate suspicious activity to be detected.

Alternatively, or in addition, by way of at least one embodiment, for each login, one monitored parameter may comprise, or may be, the geographical location, GEO, of the login. Thus, in one or more embodiments, it is possible to monitor the activity of the user on a geographical scale. This gives valuable information regarding the behavior of the user and helps detecting an anomaly starting from the position of the user. For example, for a user who never logs in from a specific country or region, several logins carried out from the country or region may indicate suspicious activity to be detected.

The inventors have noticed that the combination of these three parameters, i.e. the TOD, DOW and GEO, allows efficient and reactive anomaly detection.

For example, in at least one embodiment, for a monitored parameter that is the time of the day, the predetermined values, i.e. the bins, associated to said parameter may be (8 h-12 h; 12 h-16 h; 16 h-20 h; 20 h-24 h). The values may be determined specifically for a given user. For another user, the bins may be different than those indicated here.

According to one or more embodiments, for a monitored parameter that is the day of the week, the predetermined values, i.e. the bins, associated to said parameter may be (Monday; Tuesday; Wednesday; Thursday; Friday; Saturday; Sunday). The values may be determined specifically for a given user. For another user, the bins for this parameter may be different than those indicated here.

The density probability, noted $P_a(b)$, of a bin "b" of a parameter "a" may be calculated according to any appropriate formula or relation, in at least one embodiment.

In one or more embodiments, the probability density $P_a(b)$ may be calculated according to the following relation:

$$P_a(b) = \frac{TL+1}{TLU + B_a} \quad \text{Relation 1}$$

with:
- $P_a(b)$: the probability density of the bin "b" of parameter "a";
- TL: the total number of logins for this user during the monitoring period for bin "b";
- TLU: the total number of logins for this user during the monitoring period across all Bins $B_a$; and
- $B_a$: the total number of bins for parameter "a".

The weight, noted $W_a$, of a parameter "a" may be calculated according to any appropriate formula or relation, by way of at least one embodiment.

In one or more embodiments, the weight $W_a$ of the parameter "a" for a user may be calculated according to the following relation:

with:

$$W_a(c) = \sum_{b \in a}\left[P_a(b|c) * \log_{B_{(a)}}\left[\frac{1}{P_a(b|c)}\right]\right] \quad \text{Relation 2}$$

for a User c
- $P_a(b|c)$: the probability density of the bin b of parameter a; and
- $B_a$: the total number of bins for parameter a.

The anomaly score, noted S, of the log may be calculated according to any appropriate formula or relation, by way of at least one embodiment.

In one or more embodiments, the score, S, may be calculated according to the following relation:

$$S = 1 - \left(\prod_{a=1}^{A} P_a(b|c)^{W_a}\right)^{\frac{1}{W}} \quad \text{Relation 3}$$

for a user c
- $W_a$: the weight of parameter "a";
- W: the sum of the weights of all of the parameters; and
- $P_a(b)$: the probability density of the bin "b" of parameter "a".

The method according to one or more embodiments of the invention may be used to detect login anomalies, for one or several users, for logging into cloud based SaaS Services, for example Microsoft® SaaS Services, hosted in the cloud, for example Azure cloud, using in built authentication server, such as Microsoft Azure Active Directory (AD) authentication.

The SaaS services accessed can be email, file repositories, company intranet and a number of other business applications.

The authentication server may be placed in a local or remote network, for example the Microsoft network. The SaaS services may be hosted in said network, for example the Microsoft network. Alternatively, in at least one embodiment, the services may be hosted in another network than the one hosting the authentication server.

According to one or more embodiments of the invention, it is proposed a computer program comprising instructions, which when executed by a computer, cause the computer to carry out the steps of the method according to at least one embodiment of the invention.

The computer program may be in any programming language such as C, C++, JAVA, Python, etc.

The computer program may be in machine language.

The computer program may be stored, in a non-transient memory, such as a USB stick, a flash memory, a hard-disk, a processor, a programmable electronic chop, etc.

The computer program may be stored in a computerized device such as a Smartphone, a tablet, a computer, a server, etc.

According to at least one embodiment of the invention, it is proposed a device comprising means configured to carry out the steps of the method according to one or more embodiments of the invention.

The device according to at least one embodiment of the invention may comprise means configured to carry out at least one, or a combination of at least two, of the optional features recited above in connection with the method according to one or more embodiments of the invention, in combination with the mandatory features of the method according to one or more embodiments of the invention. The device according to at least one embodiment of the invention provides the same advantages/benefits as those mentioned above for the method according to one or more embodiments of the invention.

The device according to at least one embodiment of the invention may be any computerized device such as a Smartphone, a tablet, a computer, a server, a processor, etc.

The device according to at least one embodiment of the invention may execute one or several applications to carry out the steps of the method according to one or more embodiments of the invention.

The device according to at least one embodiment of the invention may be loaded with, and configured to execute, the computer program according to one or more embodiments of the invention.

The device may comprise at least one module configured to collect a log of successful logins of the user on the authentication system over a monitoring period, by way of at least one embodiment. As indicated above, the log of successful logins over the monitoring period comprises, for each successful login, measured values of several monitored parameters. Each measured value of each monitored parameter corresponds to a predetermined value, also called bin, among several values previously defined for the parameter.

The device, in at least one embodiment, may comprise at least one module configured to calculate, for each monitored parameter, a probability density, in the log, of each predetermined value of the parameter. The calculation of each probability density may be carried out according to any formula, and more particularly according to Relation 1 indicated above, by way of one or more embodiments.

The device, in at least one embodiment, may comprise at least one module configured to calculate for each parameter, a weight, as a function of the probability density of each predetermined value of said parameter. The calculation of each weight may be carried out according to any formula, and more particularly according to Relation 2 indicated above, by way of one or more embodiments.

The device, in at least one embodiment, may comprise at least one module configured to calculate an anomaly score as a function of the weights of each parameter. The calculation of the anomaly score may be carried out according to any formula, and more particularly according to Relation 3 indicated above, by way of one or more embodiments.

The device, in at least one embodiment, may comprise at least one module configured to compare the calculated anomaly score to a predetermined threshold to determine whether there is, or not, an anomaly with the successful logins over the monitoring period.

At least one of these modules, and more generally at least one of the modules of the device according to one or more embodiments of the invention, may be an independent module separated from the other modules.

At least two of the modules may be integrated into a common module.

At least one of the modules may be a software, such as a computer program, an application, etc.

At least one of the modules may be a hardware component, such as a processor, a chip, a smartphone, a tablet, a computer, a server, etc.

At least one of the modules may be a combination of at least one software and at least one hardware component.

The device according to one or more embodiments of the invention may be hosted in the network where the authentication server is hosted.

Alternatively, the device according to one or more embodiments of the invention may be hosted outside the network where the authentication server is hosted. In this case, the device according to at least one embodiment of the invention is in communication with the authentication server, directly or indirectly, for example through a communication network, such as the Internet.

BRIEF DESCRIPTION OF THE DRAWINGS

Other advantages and characteristics will become apparent on examination of the detailed description of an embodiment which is in no way limitative, and the attached figures, where.

DETAILED DESCRIPTION OF THE INVENTION

It is well understood that the one or more embodiments that will be described below are in no way limitative. In particular, it is possible to imagine variants of the one or more embodiments of the invention comprising only a selection of the characteristics described hereinafter, in isolation from the other characteristics described, if this selection of characteristics is sufficient to confer a technical advantage or to differentiate the one or more embodiments of the invention with respect to the state of the prior art. Such a selection comprises at least one, preferably functional, characteristic without structural details, or with only a part of the structural details if this part alone is sufficient to confer a technical advantage or to differentiate the one or more embodiments of the invention with respect to the prior art.

In the FIGURES, elements common to several figures retain the same reference.

Figure 1:
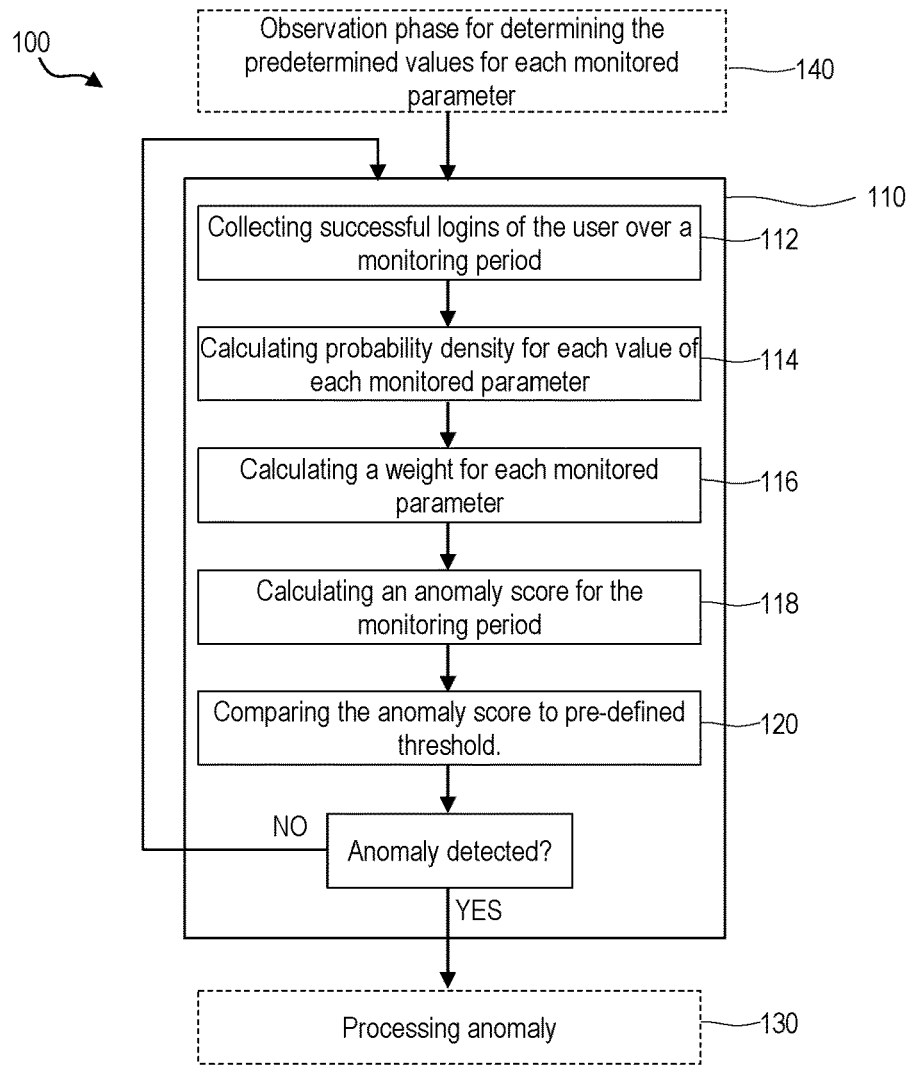
FIG. 1 is a diagrammatic representation of a non-limitative example of a method according to one or more embodiments of the invention.

FIG. 1 is a diagrammatic representation of a non-limitative example of a method according to one or more embodiments of the invention.

The method 100 of FIG. 1, by way of at least one embodiment, may be used to detect login anomalies for a user of cloud based SaaS Services, for example Microsoft® SaaS Services, hosted in the cloud, for example hosted in the Azure cloud. In order to access SaaS services hosted in the cloud, each user must be authenticated by an authentication server that is hosted in the same network as the SaaS services, for example the Microsoft® network. The authentication may be carried out by entering login data, such as a username and a password. The login data is verified against login data stored in said network, such as login data stored in an AD of said network. If the login data is correct, then the user is authenticated and the login is successful. The user than may have access to SaaS services.

The method 100, by way of at least one embodiment, may be used to detect login anomalies, for one or several users, in such a configuration. More generally, in at least one embodiment, the method 100 may be used to detect anomalies regarding the logins of a user on an authentication system, local or remote.

The method 100 is carried out individually for each user. Thus the method carries out login anomaly detection specific to each user.

The method 100, by way of one or more embodiments, comprises a monitoring phase 110 carried out for a monitoring period. For example, without loss of generality, the monitoring period may be one day.

The monitoring phase, in at least one embodiment, comprises a step 112 collecting a log of successful logins of said user on the authentication system, during the monitoring period, i.e. during one day. For each login during this monitoring phase, the values of several monitored parameters are measured. These parameters characterize each login, in time and/or in space. For example, in at least one embodiment, the measured parameters may be:

- the time of day, TOD, the successful login takes place,
- the day of the week, DOW, the successful login takes place, and
- the geographic location, GEO, where the successful login takes place.

Thus, the log of successful logins indicates, for each successful login, the values for these three parameters. Again, the monitored parameters are not limited to those indicated above. The monitored parameters may comprise at least one parameter that is not mentioned above. The monitored parameters may not comprise at least one parameter that is mentioned above.

The log of successful logins may be collected from the authentication server, such as the Microsoft® network for example, by requesting said log from the authentication server.

For each parameter, in at least one embodiment, values are determined, prior to the monitoring phase 110. This is the observation period 140. For example, without loss of generality, the observation period may be thirty days.

These predetermined values are also called bins in the present document, according to one or more embodiments.

The predetermined values, i.e. the bins, for at least one monitored parameter may be specific for at least one, in particular for each, user.

For example, in at least one embodiment, for the TOD parameter, the predetermined values, i.e. the bins, may be (8 h-12 h; 12 h-16 h; 16 h-20 h; 20 h-24 h) for at least one user.

For example, in at least one embodiment, for the DOW parameter, the predetermined values, i.e. the bins, associated to said parameter may be (Monday; Tuesday; Wednesday; Thursday; Friday; Saturday; Sunday), for at least one user.

For at least one user, in at least one embodiment, the bins for at least one parameter may be determined during an observation phase carried out prior to the monitoring phase.

The monitoring phase 110, in at least one embodiment, comprises a step 114 calculating, for each value of each monitored parameter, a probability density, in said log. During this step, for each bin previously determined for each monitored parameter, a probability density is calculated. The probability density of a bin of a parameter is dependent on the number of occurrences of said bin in the log.

In one or more embodiments, the probability density, noted $P_a(b)$, of a bin "b" for a parameter "a" may be calculated according to the following relation:

$$P_a(b) = \frac{TL+1}{TLU+B_a} \quad \text{Relation 1}$$

with:
- $P_a(b)$: the probability density of the bin "b" of parameter "a";
- TL: the total number of logins for this user during the monitoring period for bin "b";
- TLU: the total number of logins for this user during the monitoring period across all Bins $B_a$; and
- $B_a$: the total number of bins for parameter "a".

The monitoring phase 110, in at least one embodiment, comprises a step 116 calculating, for each monitored parameter, a weight, in said log. For each parameter, the weight may be calculated as a function of the density probabilities of each bin of the parameter, calculated during step 114.

In one or more embodiments, the weight $W_a$ of the parameter "a" for a user may be calculated according to the following relation:

$$W_a(c) = \sum_{b \in a} \left[ P_a(b|c) * \log_{B_{(a)}}\left[\frac{1}{P_a(b|c)}\right] \right] \quad \text{Relation 2}$$

with:
for a User c
- $P_a(b|c)$: the probability density of the bin b of parameter a; and
- $B_a$: the total number of bins for parameter a.

In this specific example, the weight for the parameter "a" corresponds to the sum of the weights of the bins of said parameter.

The monitoring phase 110, in at least one embodiment, comprises a step 118 calculating an anomaly score for the logins of the user during the monitoring period. The anomaly score may be calculated as a function of the weights calculated during step 116 and the probability densities calculated during step 114.

In one or more embodiments, the score, S, may be calculated according to the following relation:

$$S = 1 - \left( \prod_{a=1}^{A} P_a(b|c)^{W_a} \right)^{\frac{1}{W}} \quad \text{Relation 3}$$

for a user c
- $W_a$: the weight of parameter "a";
- W: the sum of the weights of all of the parameters; and
- $P_a(b)$: the probability density of the bin "b" of parameter "a".

The monitoring phase 110, in at least one embodiment, comprises a step 120 for comparing the anomaly score calculated in step 118 to a given threshold. The threshold may be specific for each user. The threshold may be the same for at least two, and in particular for all, users.

According to at least one embodiment, the threshold may be 0.7.

If the anomaly score is smaller than the threshold, in at least one embodiment, then no anomaly is detected. Another iteration of the monitoring phase 110 may be carried out.

If the anomaly score is equal to, or greater than, the threshold value then an anomaly is detected. In this case, by way of one or more embodiments, the method 100 may comprise an optional step 130 for carrying out a specific action in order to:
- stop the anomaly, for example by denying access to the user, and/or report the anomaly, for example by emitting an alert to the user, to an administrator, etc.

The method 100, in at least one embodiment, may also comprise an optional observation phase 140 for determining, at least one value, or bin, for at least one monitored parameter. Thus, by way of one or more embodiments, it is possible to determine bins that are specific to each user. The determination of a least one bin for at least one monitored parameter may be done by collecting logs of successful logins during an observation period and detecting in said logs each different value of said parameter. Each different value may thus be stored as a bin, to be used during the monitoring phases(s) for this parameter and for this user, by way of at least one embodiment.

This enables a more personalized, and user centric, anomaly detection. Indeed, in at least one embodiment, the monitored parameters may take different values for different users. At least one embodiment of the invention allows use of values that are specific for each user and not to use generic values common to all users.

The observation period may be for example a week or a month.

Figure 2:
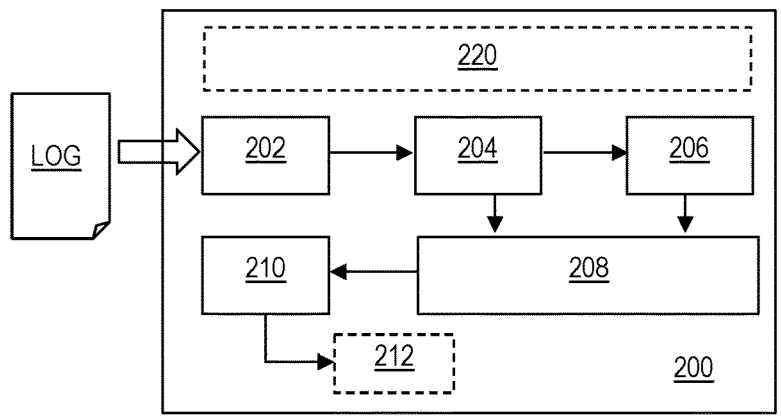
FIG. 2 is a diagrammatic representation of a non-limitative example of a device according to one or more embodiments of the invention.

FIG. 2 is a diagrammatic representation of a non-limitative example of a device according to one or more embodiments of the invention.

The device 200 of FIG. 2 may be used to carry out a method according to one or more embodiments of the invention, and more specifically the method 100 of FIG. 1. The device 200 may be any computerized device such as a Smartphone, a tablet, a computer, a server, a processor, etc.

The device 200, in at least one embodiment, may be hosted in the remote network, i.e. the network hosting the authentication network. Alternatively, in at least one embodiment, the device 200 may be distant to said network. In this case, the device 200 is in communication with the remote network, or at least the authentication server.

The device 200, in one or more embodiments, comprises a module 202 for collecting the log of successful logins for a user, for example from the authentication server. Without loss of generality, the log collection module 202 may be configured to carry out the log collection step 112 of the method 100.

The device 200, in one or more embodiments, comprises a module 204 for calculating probability densities of each value of each monitored parameter in the log collected by the module 202 for a monitoring period. Without loss of generality, in at least one embodiment, the calculating module 204 may be configured to carry out the probability density calculation step 114 of the method 100.

The device 200, in at least one embodiment, comprises a module 206 for calculating a weight for each monitored parameter in the log collected by the module 202 for a monitoring period. Without loss of generality, in one or more embodiments, the weight calculating module 206 may be configured to carry out the weight calculation step 116 of the method 100.

The device 200, in at least one embodiment, further comprises a module 208 for calculating an anomaly score corresponding to the log collected by the module 202, i.e. to the monitoring period for which said log is collected. Without loss of generality, in at least one embodiment, the anomaly score calculating module 208 may be configured to carry out the anomaly score calculation step 118 of the method 100.

The device 200, in one or more embodiments, moreover comprises a module 210 for comparing the anomaly score to a threshold to determine whether there is an anomaly in the logins of the user over the monitoring period. Without loss of generality, in at least one embodiment, the comparison module 210 may be configured to carry out the step 120 of the method 100.

The device 200, in one or more embodiments, may optionally comprise a module 212 for carrying out a specific action when an anomaly is detected for a monitoring period, in order to:
stop the anomaly, for example by denying access to the user, and/or
report the anomaly, for example by emitting an alert to the user, to an administrator, etc.
etc.

The device 200, in at least one embodiment, may optionally comprise a module 220 for carrying out an observation phase, for example the observation phase 140 of method 100, for determining, at least one value, or bin, for at least one monitored parameter.

At least one of the modules of the device 200 described with reference to FIG. 2, and more generally at least one of the modules of the device according to one or more embodiments of the invention, may be an independent module separated from the other modules.

By way of one or more embodiments, at least two of the modules may be integrated into a common module.

By way of one or more embodiments, at least one of the modules may be a software, such as a computer program, an application, etc.

By way of one or more embodiments, at least one of the modules may be a hardware component, such as a processor, a chip, a smartphone, a tablet, a computer, a server, etc.

By way of one or more embodiments, at least one of the modules may be a combination of at least one software and at least one hardware component.

Of course, the one or more embodiments of the invention are not limited to the examples detailed above.

What is claimed is:

1. A method for detecting one or more anomalies regarding logins of a user on an authentication system, wherein said method is configured to be implemented by a computer comprising a processor, wherein said authentication system comprises a local authentication system or a remote authentication system comprising a remote Active Directory (AD) authentication system, said method comprising:
at least one iteration of a monitoring phase for said user, said monitoring phase comprising collecting a log of successful logins of said user on said authentication system over a monitoring period by requesting said log of successful logins from the authentication system, wherein
said log comprises, for each successful login, measured values of several monitored parameters;
each measured value of each monitored parameter corresponds to a predetermined value among several predetermined values, wherein said several predetermined values comprise bins, previously defined for said each monitored parameter;
calculating, for said each monitored parameter, a probability density, in said log, of each predetermined value of said several predetermined values of said each monitored parameter;
calculating, for said each monitored parameter, a weight, as a function of said probability density of said each predetermined value of said each monitored parameter;
calculating an anomaly score for said log as a function of said weight of said each monitored parameter and said probability density of said each monitored parameter;

comparing said anomaly score to a given threshold in order to determine an anomaly in said log for said user, wherein
  when said anomaly score is smaller than the given threshold, then no anomaly is detected and another iteration of said monitoring phase is carried out, and
  when said anomaly score is equal to or greater than the given threshold, then said anomaly is detected; and
when said anomaly is detected, one or more of
  stopping the anomaly by denying access to the user,
  reporting the anomaly by emitting an alert to the user or to an administrator.

2. The method according to claim 1, wherein the monitoring period is a day.

3. The method according to claim 1, wherein, for said each successful login, the several monitored parameters comprise at least one of
a time of day (TOD) of the each successful login,
a day of week (DOW) of the each successful login, and
a geographical location (GEO) of the each successful login.

4. The method according to claim 3, wherein the bins are
TOW: 8 h-12 h; 12 h-16 h; 16 h-20 h; 20 h-24 h;
TOW: Monday; Tuesday; Wednesday; Thursday; Friday; Saturday; Sunday.

5. The method according to claim 1, wherein the probability density, $P_a(b)$, of a bin "b" of said bins of a parameter "a" of said several monitored parameters is calculated according to a formula comprising $$P_a(b) = \frac{TL+1}{TLU+B_a} \quad \text{Relation 1}$$

with:
$P_a(b)$: the probability density of the bin "b" of the parameter "a";
TL: a total number of logins for the user during the monitoring period for said bin "b";
TLU: a total number of logins for the user during the monitoring period across all Bins $B_a$; and
$B_a$: a total number of bins for said parameter "a".

6. The method according to claim 1, wherein a weight $W_a$ of a parameter "a" of said several monitored parameters is calculated according to a formula comprising $$W_a(c) = \sum_{b \in a} \left[ P_a(b|c) * \log_{B_{(a)}} \left[ \frac{1}{P_a(b|c)} \right] \right] \quad \text{Relation 2}$$

with said user "c":
$P_a(b|c)$: the probability density of a bin "b" of said bins of said parameter "a"; and
$B_a$: a total number of bins for said parameter "a".

7. The method according to claim 1, wherein the anomaly score, S, is calculated according to a formula comprising $$S = 1 - \left( \prod_{a=1}^{A} P_a(b|c)^{W_a} \right)^{\frac{1}{W}} \quad \text{Relation 3}$$

with for said user "c":
$W_a$: the weight of a parameter "a" of said several monitored parameters;
W: a sum of weights of all of the several monitored parameters; and
$P_a(b)$: the probability density of a bin "b" of said bins of said parameter "a".

8. A non-transitory computer program comprising instructions, which when executed by a computer, cause the computer to carry out a method for detecting one or more anomalies regarding logins of a user on an authentication system, wherein said method is configured to be implemented by said computer comprising a processor, wherein said authentication system comprises a local authentication system or a remote authentication system comprising a remote Active Directory (AD) authentication system, said method comprising:
at least one iteration of a monitoring phase for said user, said monitoring phase comprising
  collecting a log of successful logins of said user on said authentication system over a monitoring period by requesting said log of successful logins from the authentication system, wherein
    said log comprises, for each successful login, measured values of several monitored parameters;
    each measured value of each monitored parameter corresponds to a predetermined value among several predetermined values, wherein said several predetermined values comprise bins, previously defined for said each monitored parameter;
calculating, for said each monitored parameter, a probability density, in said log, of each predetermined value of said several predetermined values of said each monitored parameter;
calculating, for said each monitored parameter, a weight, as a function of said probability density of said each predetermined value of said each monitored parameter;
calculating an anomaly score for said log as a function of said weight of said each monitored parameter and said probability density of said each monitored parameter;
comparing said anomaly score to a given threshold in order to determine an anomaly in said log for said user, wherein
  when said anomaly score is smaller than the given threshold, then no anomaly is detected and another iteration of said monitoring phase is carried out, and
  when said anomaly score is equal to or greater than the given threshold, then said anomaly is detected; and
when said anomaly is detected, one or more of
  stopping the anomaly by denying access to the user,
  reporting the anomaly by emitting an alert to the user or to an administrator.

9. A device comprising:
a computerized device comprising a processor configured to carry out a method for detecting one or more anomalies regarding logins of a user on an authentication system,
wherein said authentication system comprises a local authentication system or a remote authentication system comprising a remote Active Directory (AD) authentication system,
wherein said method comprises
  at least one iteration of a monitoring phase for said user, said monitoring phase comprising collecting a log of successful logins of said user on said authentication system over a monitoring period by requesting said log of successful logins from the authentication system, wherein
    said log comprises, for each successful login, measured values of several monitored parameters;

each measured value of each monitored parameter corresponds to a predetermined value among several predetermined values, wherein said several predetermined values comprise bins, previously defined for said each monitored parameter;

calculating, for said each monitored parameter, a probability density, in said log, of each predetermined value of said several predetermined values of said each monitored parameter;

calculating, for said each monitored parameter, a weight, as a function of said probability density of said each predetermined value of said each monitored parameter;

calculating an anomaly score for said log as a function of said weight of said each monitored parameter and said probability density of said each monitored parameter;

comparing said anomaly score to a given threshold in order to determine an anomaly in said log for said user, wherein
- when said anomaly score is smaller than the given threshold, then no anomaly is detected and another iteration of said monitoring phase is carried out, and
- when said anomaly score is equal to or greater than the given threshold, then said anomaly is detected; and when said anomaly is detected, one or more of stopping the anomaly by denying access to the user,
reporting the anomaly by emitting an alert to the user or to an administrator.

* * * * *